United States Patent
Chen et al.

(10) Patent No.: US 8,385,661 B2
(45) Date of Patent: Feb. 26, 2013

(54) HAND-HELD MOBILE APPARATUS AND METHOD OF QUCKLY DISPLAYING ONLINE COMMUNITY FRIENDS' IMAGES APPLICABLE THERETO

(75) Inventors: Zhu Chen, Shanghai (CN); Gang Chen, Shanghai (CN); Qi Guo, Shanghai (CN)

(73) Assignees: Mitac International Corp., Taoyuan County (TW); Mitac Research (Shanghai) Ltd., Shanghai (CN)

( * ) Notice: Subject to any disclaimer, the term of this patent is extended or adjusted under 35 U.S.C. 154(b) by 254 days.

(21) Appl. No.: 13/043,896

(22) Filed: Mar. 9, 2011

(65) Prior Publication Data

US 2012/0020572 A1 Jan. 26, 2012

(30) Foreign Application Priority Data

Jul. 21, 2010 (TW) .............................. 99124062 A

(51) Int. Cl.
*G06K 9/62* (2006.01)
*G06K 9/68* (2006.01)
*G06K 9/70* (2006.01)
*G06K 9/32* (2006.01)
*G06K 9/60* (2006.01)

(52) U.S. Cl. ........ 382/224; 382/218; 382/226; 382/298; 382/299; 382/305

(58) Field of Classification Search ................. None
See application file for complete search history.

(56) References Cited

U.S. PATENT DOCUMENTS

| | | | | |
|---|---|---|---|---|
| 7,454,041 B2 * | 11/2008 | Sukegawa et al. | ............ | 382/118 |
| 7,954,055 B2 * | 5/2011 | Sylthe | ............ | 715/273 |
| 8,296,686 B1 * | 10/2012 | Tedesco et al. | ............ | 715/865 |
| 2009/0044128 A1 * | 2/2009 | Baumgarten et al. | ......... | 715/738 |
| 2010/0046842 A1 * | 2/2010 | Conwell | ............ | 382/218 |
| 2010/0162171 A1 * | 6/2010 | Felt et al. | ............ | 715/835 |

FOREIGN PATENT DOCUMENTS

JP 2003296182 A * 10/2003

* cited by examiner

*Primary Examiner* — Tom Y Lu
*Assistant Examiner* — Thomas Conway
(74) *Attorney, Agent, or Firm* — WPAT, P.C.; Anthony King

(57) ABSTRACT

A hand-held mobile apparatus and method of quickly displaying online community friends' images applicable thereto are disclosed. The hand-held mobile apparatus includes a network communication module for linking to an online community server; a comparison module for comparing and determining whether data of a web image in the online community server matches data of a local image in a storage unit of the apparatus; a recognition module for determining an image type of the web image when the web image data is different from the local image data; a processing unit for downloading the web image of a first type in a smallest image size or the web image of a second type in an image size matching a screen resolution of the apparatus, and storing the web image in the storage unit as the local image; and a display unit for displaying the local image.

10 Claims, 4 Drawing Sheets

HAND-HELD MOBILE APPARATUS AND METHOD OF QUCKLY DISPLAYING ONLINE COMMUNITY FRIENDS' IMAGES APPLICABLE THERETO

FIELD OF THE INVENTION

The present invention relates to a hand-held mobile apparatus and method of quickly displaying online community friends' images applicable thereto; and more particularly to a hand-held mobile apparatus capable of quickly updating and displaying friends' images and a method of quickly displaying online community friends' images applicable to the hand-held mobile apparatus.

BACKGROUND OF THE INVENTION

In recent years, the interactive social networking service has built many effective online communities, and provides means for users of online communities to interact and contact with one another over the Internet, such as instant messaging, discussion group, e-mail, online chat room, or real-time audio-visual sharing. Some famous social networking service websites include Facebook, Twitter, Plurk, Kaixin, Renren, and so on. Through these social networking service websites, users can share their activities, ideas and images and update personal profile within their individual online communities. Such online communities are widely welcomed by the young generation and have even become an important part in their daily life. One of the core functions of the social networking service websites is to allow users in their online communities to share their images online. For example, the sharing of online community friends' head images increases the visibility and fun of interaction among online community friends.

Meanwhile, with the increasingly matured technique in the field of hand-held mobile apparatus, the services that can be provided via the hand-held mobile apparatus are also become wider and wider. It is already a main trend in the market to incorporate the social networking service into the hand-held mobile apparatus. However, the hand-held mobile apparatus generally have limited network transmission speed, network flow, functions and memory capacity, and therefore fail to quickly display online community friends' images, including head images and images other than the head images.

Therefore, the social networking service application programs for most of the currently commercially available hand-held mobile apparatus exclude the function of displaying online community friends' images. Even if some of the hand-held mobile apparatus can still be used to browse online friends' images over the Internet, they require relatively long time to display the online friends' images and have low working efficiency, and are therefore not welcomed among users. Under this circumstance, the hand-held mobile apparatus just could not provide the user with the fun of browsing the social networking service websites and sharing online community friends' images.

SUMMARY OF THE INVENTION

It is therefore a primary object of the present invention to provide a hand-held mobile apparatus and a method of quickly displaying online community friends' images applicable to the apparatus, so as to solve the problem in the conventional hand-held mobile apparatus as failing to quickly display online friends' images.

To achieve the above and other objects, the hand-held mobile apparatus according to the present invention includes a processing unit connected to a network communication module, a storage unit, a comparison module, a recognition module, and a display unit. The network communication module is linked to an online community server via a network system. The online community server and the storage unit are used to store a web image and a local image, respectively. The comparison module compares to determine whether data of the web image in the online community server matches data of the local image in the storage unit. The recognition module is connected to the comparison module. When the comparison module determines that the web image data is different from the local image data, the recognition module receives the web image and determines whether the web image is of a first or a second image type. In the case the recognition module determines that the web image is of the first image type, the processing unit will download the web image in the smallest possible image size thereof, or in the case the recognition module determines that the web image is of the second image type, the processing unit will then download the web image in an image size matching a screen resolution of the apparatus, and the downloaded web image is used as the local image and stored in the storage unit. The local image stored in the storage unit can be transmitted by the processing unit to the display unit for displaying.

The online community server can be a social networking service (SNS) website selected from the group consisting of Facebook, Twitter, Plurk, and Myspace.

The network system can be a telecommunication network or a wireless network.

In the present invention, the web image data and the local image data can respectively include a time tag, a title, a path, and a format of the image.

In the present invention, the recognition module determines whether the web image is of the first or the second image type by recognizing a path directed to the web image in the online community server.

To achieve the above and other objects, the method of quickly displaying online community friends' images according to the present invention is applicable to a hand-held mobile apparatus having a network communication module, a storage unit, a comparison module, a recognition module, a processing unit and a display unit. The method includes the following steps: linking the network communication module to an online community server via a network system; using the comparison module to compare and accordingly determine whether data of a web image stored in the online community server matches data of a local image stored in the storage unit; in the case the comparison module determining that the web image data is different from the local image data, using the recognition module to determine whether the web image is of a first or a second image type; using the processing unit to download the web image in the smallest image size thereof in the case the web image is determined by the recognition module as the first image type, or using the processing unit to download the web image in an image size matching a screen resolution of the hand-held mobile apparatus in the case the web image is determined by the recognition module as the second image type; using the downloaded web image as the local image and storing the same in the storage unit; and displaying the local image in the display unit.

The online community server can be a social networking service (SNS) website selected from the group consisting of Facebook, Twitter, Plurk, and Myspace.

The network system can be a telecommunication network or a wireless network.

In the method of the present invention, the web image data and the local image data can respectively include a time tag, a title, a path, and a format of the image.

In the method of the present invention, the recognition module determines whether the web image is of the first or the second image type by recognizing a path directed to the web image in the online community server.

With the above arrangements, the present invention is superior to the prior art in having one or more of the following advantages:

(1) The hand-held mobile apparatus and the method of quickly displaying online community friends' image applicable thereto according to the present invention are able to determine whether a web image has already been downloaded to, added to, or updated in the hand-held mobile apparatus, so as to avoid repeatedly downloading the same web image.

(2) In consideration of the relatively small memory capacity of general hand-held mobile apparatus, the hand-held mobile apparatus and the method of quickly displaying online community friends' image applicable thereto according to the present invention would download the web image in its smallest image size or in an image size matching the screen resolution of the hand-held mobile apparatus, so as to effectively reduce the volume of the memory being occupied by the web image.

(3) By downloading the web image in its smallest image size or in an image size matching the screen resolution of the hand-held mobile apparatus, the hand-held mobile apparatus and the method of quickly displaying online community friends' image applicable thereto according to the present invention are able to effectively shorten the time needed by the hand-held mobile apparatus to download the web image and accordingly, achieve the object of quickly displaying the web image.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
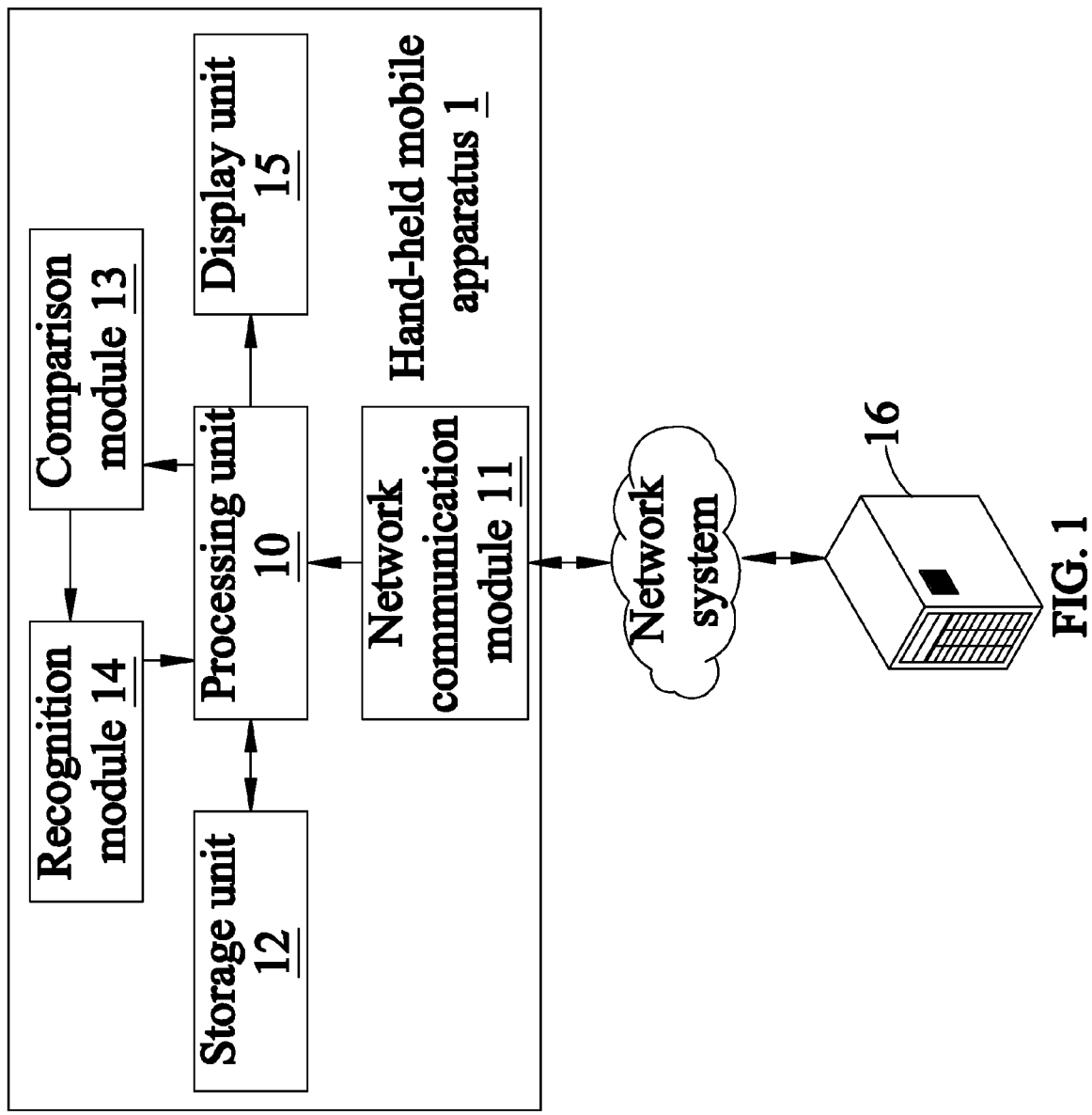
FIG. 1 is a conceptual view of a hand-held mobile apparatus according to the present invention.

The present invention will now be described with a preferred embodiment thereof and with reference to the accompanying drawings. For the purpose of easy to understand, elements that are the same in the preferred embodiment are denoted by the same reference numerals.

Figure 2:
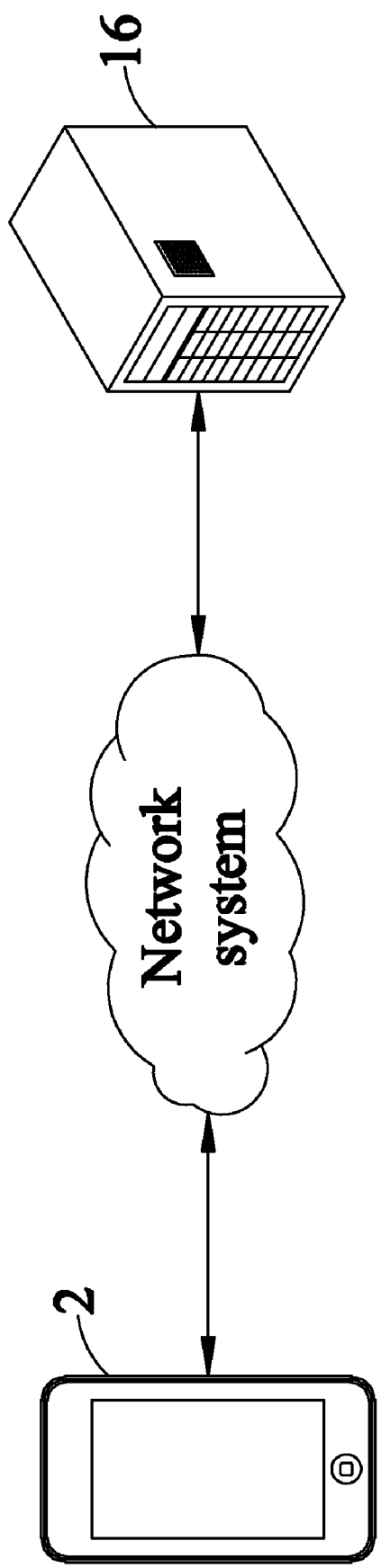
FIG. 2 is a conceptual view showing an embodiment of the hand-held mobile apparatus of the present invention.

FIG. 1 is a conceptual view of a hand-held mobile apparatus 1 according to the present invention; and FIG. 2 is a conceptual view showing an embodiment of the hand-held mobile apparatus of the present invention. Please refer to FIGS. 1 and 2 at the same time. The hand-held mobile apparatus 1 includes a processing unit 10, a network communication module 11, a storage unit 12, a comparison module 13, a recognition module 14, and a display unit 15. As can be seen in FIG. 2, the hand-held mobile apparatus 1 can be a mobile phone 2 or a personal digital assistant (PDA). The network communication module 11 can be linked to an online community server 16 via a network system. The online community server 16 is used to store web images therein. The network system can be a telecommunication network or a wireless network. When a user wants to use the hand-held mobile apparatus 1 to browse a social networking service website, such as Facebook, Twitter, Plurk or Myspace, the processing unit 10 uses the network communication module 11 to link to the online community service server 16 of the social networking service website via a telecommunication network or a wireless network. The processing unit 10 also uses the comparison module 13 to compare data of a web image stored in the online community server 16 with data of a local image stored in the storage unit 12. The image data can include, for example, a time tag, a title, a size, a path and a format of an image. In the case the comparison module 13 compares and determines the web image is different from the local image, the recognition module 14 is used to receive the web image and recognize a path directed to the web image in the online community server 16, so as to determine whether the web image is of a first image type or a second image type. For example, an image of the first image type has a path of "../public/uploads/HeadImage/", and an image of the second image type has a path of "../public/uploads/ShareImage/".

Figure 3:
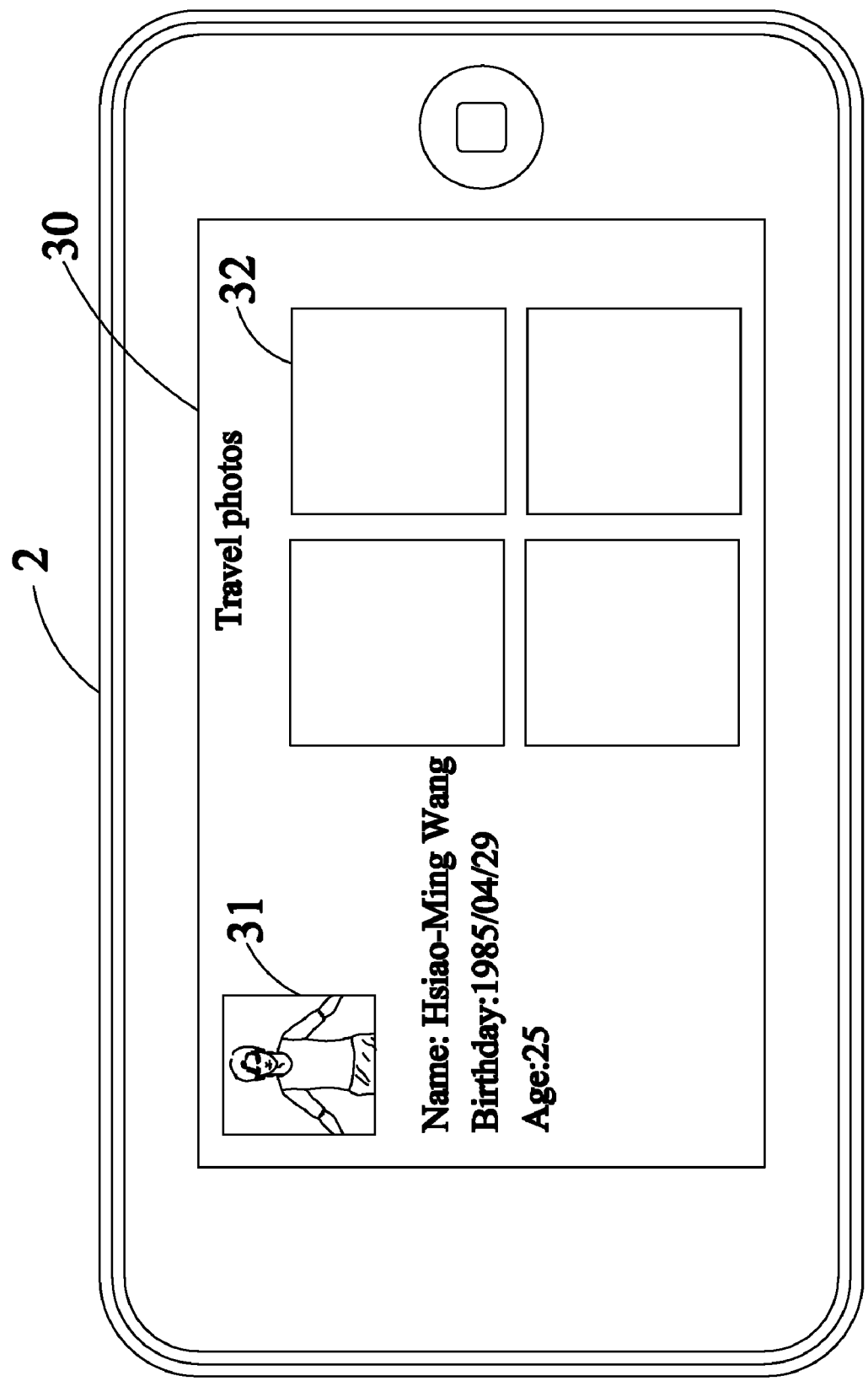
FIG. 3 is a schematic view showing the contents displayed on a screen of a mobile phone as an embodiment of the hand-held mobile apparatus of the present invention.

Please refer to FIG. 3 that is a schematic view showing some contents displayed on a screen 30 of a mobile phone 2 as an embodiment of the hand-held mobile apparatus 1 of the present invention. An image of the first image type can be a head image 31 of a friend's image on the Facebook website, such as the representative head image on the upper left corner of the Facebook website for recognizing a friend. An image of the second image type can be any picture or photo of a friend's image other than the head image on the Facebook website, such as a photo showing the friend's travel or daily life, and will be referred to as a non-head image picture 32 herein. Therefore, the comparison module 13 is able to determine whether an online community friend's image has been downloaded to, added to or updated in the hand-held mobile apparatus 1 to avoid any repeated downloading.

In the case the recognition module 14 determines the web image is a head image 31, the processing unit 10 will then use the network communication module 11 to download from the online community server 16 via the network system the head image 31 in a smallest possible image size thereof. For instance, the head image is available in three different image sizes, namely, 50×50 pixels, 100×10 pixels, and 120×120 pixels. In this case, the head image in the image size of 50×50 pixels will be downloaded.

Alternatively, in the case the recognition module 14 determines the web image is a non-head image 32, the processing unit 10 will then use the network communication module 11 to download from the online community server 16 via the network system the non-head image 32 in an image size matching a screen resolution of the hand-held mobile apparatus 1, which is a mobile phone 2 in FIG. 3. For example, the non-head image is available in four different image sizes, namely, 160×240 pixels, 320×480 pixels, 1280×960 pixels, and 1600×1200 pixels; and the hand-held mobile apparatus 1 has a screen resolution of 640×480 pixels. In this case, the non-head image in the image size of 320×480 pixels is downloaded. In this manner, it is able to save the memory space, effectively shorten the download time, and display the best quality web image on the hand-held mobile apparatus 1.

The head image 31 and the non-head image 32 being downloaded by the processing unit 10 from the online community server 16 using the network communication module 11 via the network system are stored in the storage unit 12. The storage unit 12 can be a built-in memory card, an externally connected memory card, or a flash memory. The processing unit 10 can further use the display unit 15 to display the head image 31 and the non-head image 32. The display unit 15 can be the screen 30 of the mobile phone 2, as shown in FIG. 3. Thus, it is able to achieve the object of quickly displaying online community friends' images on a hand-held mobile apparatus 1.

Figure 4:
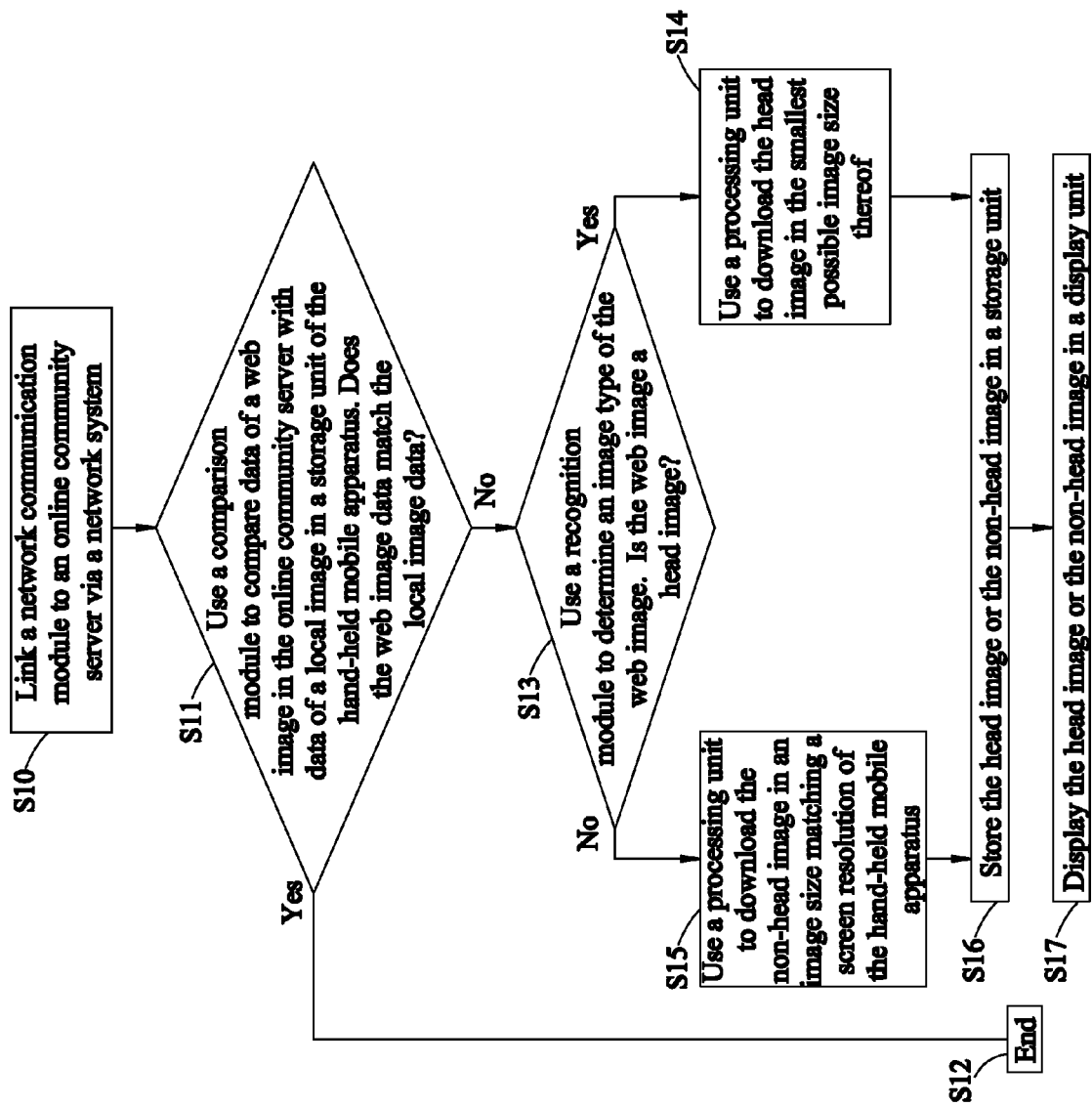
FIG. 4 is a flowchart showing the steps included in a method of quickly displaying online community friends' images according to the present invention.

Please refer to FIG. 4 that is a flowchart showing the steps included in a method of quickly displaying online community friends' images according to the present invention. The method is applicable to a hand-held mobile apparatus having a processing unit connected to a network communication module, a storage unit, a comparison module, a recognition module, and a display unit. And, head images and images other than the head images, or briefly referred to as non-head images can be transmitted by the processing unit to the display unit for displaying. The method includes the following steps:

linking the network communication module to an online community server via a network system (S10);

using the comparison module to compare data of a web image in the online community server with data of a local image stored in the storage unit, so as to determine whether the web image data matches the local image data (S11); if yes, going to a step S12; or if no, going to a step S13;

in the step S12, the method is ended;

in the step S13, using the recognition module to determine whether the web image is a head image or not; if yes, going to a step S14; and if no, going to a step S15;

in the step S14, using the processing unit to download the head image in a smallest possible image size thereof;

in the step S15, using the processing unit to download the non-head image in an image size matching a screen resolution of the hand-held mobile apparatus;

storing the head image or the non-head image in the storage unit (S16); and displaying the head image or the non-head image in the display unit.

In the method of the present invention, the network communication module can be linked to the online community server via a telecommunication network or a wireless network; and the online community server can be a social networking service (SNS) website, such as Facebook, Twitter, Plurk, or Myspace. And, the image data can include a time tag, a title, a path and a format of an image.

Further, in the method of the present invention, the recognition module determines whether the web image is a head image or not by recognizing a path directed to the web image in the online community server, and avoids a web image from being repeatedly downloaded.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A hand-held mobile apparatus, comprising:
  a network communication module for linking to an online community server via a network system; and the online community server having a web image stored therein;
  a storage unit for storing a local image therein;
  a comparison module for comparing data of the web image with data of the local image and determining whether the web image data matches the local image data;
  a recognition module being connected to the comparison module for receiving the web image when the comparison module determines the web image data is different from the local image data, and for determining whether the web image is of a first image type or a second image type;
  a processing unit being connected to the network communication module, the storage unit, the comparison module and the recognition module; in the case the recognition module determining that the web image is of the first image type, the processing unit downloading from the online community server via the network communication module the web image in a smallest possible image size thereof; or in the case the recognition module determining that the web image is of the second image type, the processing unit downloading from the online community server via the network communication module the web image in an image size matching a screen resolution of the hand-held mobile apparatus; wherein the downloaded web image is used as the local image and stored in the storage unit; and
  a display unit being connected to the processing unit for displaying the local image transmitted thereto by the processing unit.

2. The hand-held mobile apparatus as claimed in claim 1, wherein the online community server includes a social networking service (SNS) website, and the SNS website is selected from the group consisting of Facebook, Twitter, Plurk and Myspace.

3. The hand-held mobile apparatus as claimed in claim 1, wherein the network system is selected from the group consisting of a telecommunication network and a wireless network.

4. The hand-held mobile apparatus as claimed in claim 1, wherein the web image data and the local image data respectively include a time tag, a title, a path, and a format of the image.

5. The hand-held mobile apparatus as claimed in claim 1, wherein the recognition module determines whether the web image is of the first or the second image type by recognizing a path directed to the web image in the online community server.

6. A method of quickly displaying online community friends' images being applicable to a hand-held mobile apparatus having a network communication module, a storage unit, a comparison module, a recognition module, a processing unit and a display unit, comprising the following steps:
  linking the network communication module to an online community server via a network system;
  using the comparison module to compare data of a web image stored in the online community server with data of a local image stored in the storage unit, and to determine whether the web image data matches the local image data;
  in the case the comparison module determining that the web image data is different from the local image data, then, using the recognition module to determine whether the web image is of a first image type or a second image type;
  in the case the recognition module determining that the web image is of the first image type, then, using the processing unit to download the web image in a smallest possible image size thereof; or, in the case the recognition module determining that the web image is of the second image type, then, using the processing unit to download the web image in an image size matching a screen resolution of the hand-held mobile apparatus;

using the web image as the local image;

storing the web image in the storage unit; and displaying the local image in the display unit.

7. The method of quickly displaying online community friends' images as claimed in claim 6, wherein the online community server includes a social networking service (SNS) website, and the SNS website is selected from the group consisting of Facebook, Twitter, Plurk and Myspace.

8. The method of quickly displaying online community friends' images as claimed in claim 6, wherein the network system is selected from the group consisting of a telecommunication network and a wireless network.

9. The method of quickly displaying online community friends' images as claimed in claim 6, wherein the web image data and the local image data respectively include a time tag, a title, a path, and a format of the image.

10. The method of quickly displaying online community friends' images as claimed in claim 6, wherein the recognition module determines whether the web image is of the first or the second image type by recognizing a path directed to the web image in the online community server.

* * * * *